US008112451B1

(12) United States Patent
Graham et al.

(10) Patent No.: US 8,112,451 B1
(45) Date of Patent: Feb. 7, 2012

(54) USING INTENSIONAL CATEGORY ASSIGNMENT FOR A CONFIGURATION MANAGEMENT DATABASE

(75) Inventors: Stephen G. Graham, Chapel Hill, NC (US); Thomas Maguire, Brewster, NY (US); David Stephen Reiner, Lexington, MA (US); Jeffrey M. Nick, West Park, NY (US); John D. Hushon, Jr., Medfield, MA (US); Cornelia R. Davis, Santa Barbara, CA (US); Jurgen Leschner, Lexington, MA (US); Mark Venguerov, Westmount (CA)

(73) Assignee: EMC Corporation, Hopkinton, MA (US)

( * ) Notice: Subject to any disclaimer, the term of this patent is extended or adjusted under 35 U.S.C. 154(b) by 554 days.

(21) Appl. No.: 12/215,985

(22) Filed: Jun. 30, 2008

Related U.S. Application Data

(63) Continuation-in-part of application No. 11/205,576, filed on Aug. 17, 2005, now Pat. No. 7,480,674, which is a continuation-in-part of application No. 11/039,191, filed on Jan. 20, 2005, now Pat. No. 7,412,452, and a continuation-in-part of application No. 11/205,630, filed on Aug. 17, 2005, now Pat. No. 7,555,486, which is a continuation-in-part of application No. 11/039,191, filed on Jan. 20, 2005, now Pat. No. 7,412,452.

(51) Int. Cl.
*G06F 17/30* (2006.01)
(52) U.S. Cl. ...................................................... 707/802
(58) Field of Classification Search .................. 707/792, 707/802–805, 999.2
See application file for complete search history.

(56) References Cited

U.S. PATENT DOCUMENTS

| | | | | |
|---|---|---|---|---|
| 2006/0004875 A1* | 1/2006 | Baron et al. | | 707/200 |
| 2006/0161444 A1* | 7/2006 | Lubrecht et al. | | 705/1 |
| 2006/0161879 A1* | 7/2006 | Lubrecht et al. | | 717/101 |
| 2007/0203952 A1* | 8/2007 | Baron et al. | | 707/200 |
| 2009/0037481 A1* | 2/2009 | Baker | | 707/200 |

OTHER PUBLICATIONS

M. Semilof, "What to look for in a CMDB," published Jan. 25, 2007 at <<http://searchwinit.techtarget.com/news>>, 3 pp.

D. Clark et al., "The Federated CMDB Vision," Joint White Paper from BMC, CA, Fujitsu, HP, IBM and Microsoft, Version 1.0, Jan. 25, 2007, 10 pp.

W. Hommel and S. Knittl, "An Access Control Solution for the Inter-Organizational Use of ITIL Federated Configuration Management Database," Technischen Universitat Munchen, published May 15, 2008 at <<http://www.zdnet.co.uk/white-papers>>, 12 pp.

\* cited by examiner

*Primary Examiner* — Thu-Nguyet Le
(74) *Attorney, Agent, or Firm* — Muirhead and Saturnelli, LLC

(57) ABSTRACT

A configuration management database system includes a plurality of configuration items. Each of the configuration items includes at least one property relating to a component of an IT system. The system also includes a plurality of intensional category definitions that provide dynamic categorization of the plurality of information items. Each of the intensional category definitions includes a predicate that is operable to identify an input one of the configuration items as a member of the category based on the at least one property in the input one of the configuration items. The configuration management database system also includes at least one pre-computed category membership data structure to support efficient processing of at least one query.

20 Claims, 4 Drawing Sheets

USING INTENSIONAL CATEGORY ASSIGNMENT FOR A CONFIGURATION MANAGEMENT DATABASE

CROSS-REFERENCE TO RELATED APPLICATIONS

This application is a continuation-in-part of U.S. patent application Ser. No. 11/205,576 filed on Aug. 17, 2005, now U.S. Pat. No. 7,480,674 which is a continuation-in-part of U.S. patent application Ser. No. 11/039,191 filed on Jan. 20, 2005, now U.S. Pat. No. 7,412,452 and is a continuation-in-part of U.S. patent application Ser. No. 11/205,630 filed on Aug. 17, 2005, now U.S. Pat. No. 7,555,486 which is a continuation-in-part of U.S. patent application Ser. No. 11/039, 191 filed on Jan. 20, 2005, now U.S. Pat. No. 7,412,452 all of which are incorporated by reference herein.

BACKGROUND OF THE INVENTION

1. Technical Field

This application relates to the field of computer systems, and more particularly to the field of managing data relating to deployment of computer systems.

2. Description of Related Art

As the complexity of IT systems increases, resources needed for the management of those systems, such as personnel, equipment, etc. also increase. In addition to technical complexity and number of components, many organizations are providing additional demands on IT services to provide certain levels of data quality, dependability, cost effectiveness, return on investment, throughput, response time, etc. Furthermore, many large organizations may have more than one IT department with partially overlapping and possibly ill-defined areas of responsibility and interface constraints between the IT departments. The management challenge becomes even more acute when factoring in the difficulties associated with security, adding new components, and modifying existing components to meet user needs. These challenges are compounded with regulatory compliance, such as Payment Card Industry (PCI) regulations. Frequently, compliance with statutes requires certain constraints on the configuration of the underlying information system.

In some instances, a configuration management database (CMDB) may be used to provide a central repository of IT configuration information and history for each configuration item (CI) that is part of the IT system. The CMDB may contain descriptions of each CI in terms of its technical attributes, its ownership, its history, and its relationship to other CIs and may implement a structured data model to manage the various categories of CIs, such as business processes, business services, applications, infrastructure components, etc. Thus the CMDB may manage all the data related to CIs in an IT system to support IT operations relating to incidents, problems, changes, service levels, etc. This category of functions supported by a CMDB is commonly known as IT Service Management (ITSM) and is associated with the IT Information Library (ITIL) family of best practices.

However, a difficulty with CMDBs is that the approach is very inflexible with respect to adding new types of CIs or modifying existing CIs. In some cases, a CMDB may not be able to provide any useful information or otherwise account for a new type of CI until the CMDB's data model or other metadata has been modified, which may be some time after the new CI has been added. In addition, CMDBs may not provide the correct result in the case of run time situations that the CMDBs have not been specifically programmed to handle. More specifically, if the values of the properties of a CI changes over time, as more information about the CI is discovered, inflexible, schema-based CMDB implementations may not be able to properly incorporate this additional information about the CI. Accordingly, it is desirable to provide a CMDB system having greater flexibility and adaptability than conventional approaches to designing a CMDB.

SUMMARY OF THE INVENTION

According to the system described herein, a configuration management database system includes a plurality of configuration items, each of the configuration items including at least one property relating to a component of an IT system, a plurality of intensional category definitions that provide dynamic categorization of the plurality of configuration items, where each of said intensional category definitions includes a predicate that is operable to identify an input one of the configuration items as a member of the category based on the at least one property in the input one of the configuration items, and at least one pre-computed category membership data structure to support efficient processing of at least one query. The configuration management system may provide inputs to mechanisms that handle one or more of: change management, incident management, configuration management, problem management, release management, service level management, financial management, capacity management, IT service continuity management, and availability management. Each of the configuration item categories may apply its associated predicate to at least one of the configuration items responsive to the configuration item being created. Each of the configuration item categories may be operable to apply its associated predicate to at least one of the configuration items responsive to the configuration item being modified. The modification to the at least one existing configuration item may include addition of a new property to the configuration item. The modification to the at least one existing configuration item may include providing a new value of a property of the configuration item. The predicate for at least one of the configuration item categories may be operable to test an input configuration item for a predetermined property, and in the event that the input configuration item includes the predetermined property, generate an indication that the input configuration item is associated with the one of said configuration item categories. At least one of the configuration item categories may be configured as a synchronous category, such that all item modification operations to items associated with the synchronous one of the configuration item categories may be reflected in the results of all information retrieval operations received subsequent to receipt the item modification operations and referring to the synchronous one of the configuration item categories. At least one of the configuration item categories may be configured as an asynchronous category, such that item modification operations to items associated with the asynchronous one of the configuration item categories need not be reflected in the results of information retrieval operations received subsequent to receipt of the item modification operations and referring to the asynchronous one of the configuration item categories.

According further to the system described herein, providing a configuration management database system includes storing a plurality of configuration items, each of the configuration items including at least one property relating to a component of an IT system, storing a plurality of intensional category definitions operable to provide dynamic categorization of the plurality of configuration items, where each of the intensional category definitions includes a predicate, where the predicate is operable to identify an input one of the configuration items as a member of the category based on the at least one property in the input one of the configuration items, and pre-computing at least one category membership data structure to support efficient processing of at least one query. Providing a configuration management database may also include providing inputs to mechanisms that handle one or more of: change management, incident management, configuration management, problem management, release management, service level management, financial management, capacity management, IT service continuity management, and availability management. Pre-computing may be performed in response to at least one configuration item being added. Pre-computing may be performed in response to at least one configuration item being changed. Providing a configuration management database system may also include applying at least one predicate associated with said intensional category definitions in response to said at least one input query. Each of the configuration item categories may apply its associated predicate to at least one of the configuration items responsive to the configuration item being revised. Providing a configuration management database system may also include configuring at least one of the configuration item categories as a synchronous category and processing item modification operations to items associated with the synchronous one of the configuration item categories may be reflected in the results of all information retrieval operations received subsequent to receipt the item modification operations and referring to the synchronous one of the configuration item categories. Providing a configuration management database system may also include configuring at least one of the configuration item categories as an asynchronous category and processing item modification operations to items associated with the asynchronous one of the configuration item categories are not be reflected in the results of at least one information retrieval operation received subsequent to receipt of the item modification operations and referring to the asynchronous one of the configuration item categories. Pre-computing may be performed in response to a user request.

According further to the system described herein, a computer program provided in a computer-readable medium includes executable code that stores a plurality of configuration items, each of the configuration items including at least one property relating to a component of an IT system, executable code that stores a plurality of intensional category definitions operable to provide dynamic categorization of the plurality of configuration items, where each of the intensional category definitions includes a predicate, where the predicate is operable to identify an input one of the configuration items as a member of the category based on the at least one property in the input one of the configuration items, and executable code that pre-computes at least one category membership data structure to support efficient processing of at least one query. Data from the computer program may be used as input to mechanisms that handle one or more of: change management, incident management, configuration management, problem management, release management, service level management, financial management, capacity management, IT service continuity management, and availability management.

According further to the system described herein, a computer readable medium has computer executable instructions for performing any of the steps described herein.

According further to the system described herein, a system has at least one processor that performs any of the steps described herein.

DETAILED DESCRIPTION OF VARIOUS EMBODIMENTS

Figure 1:
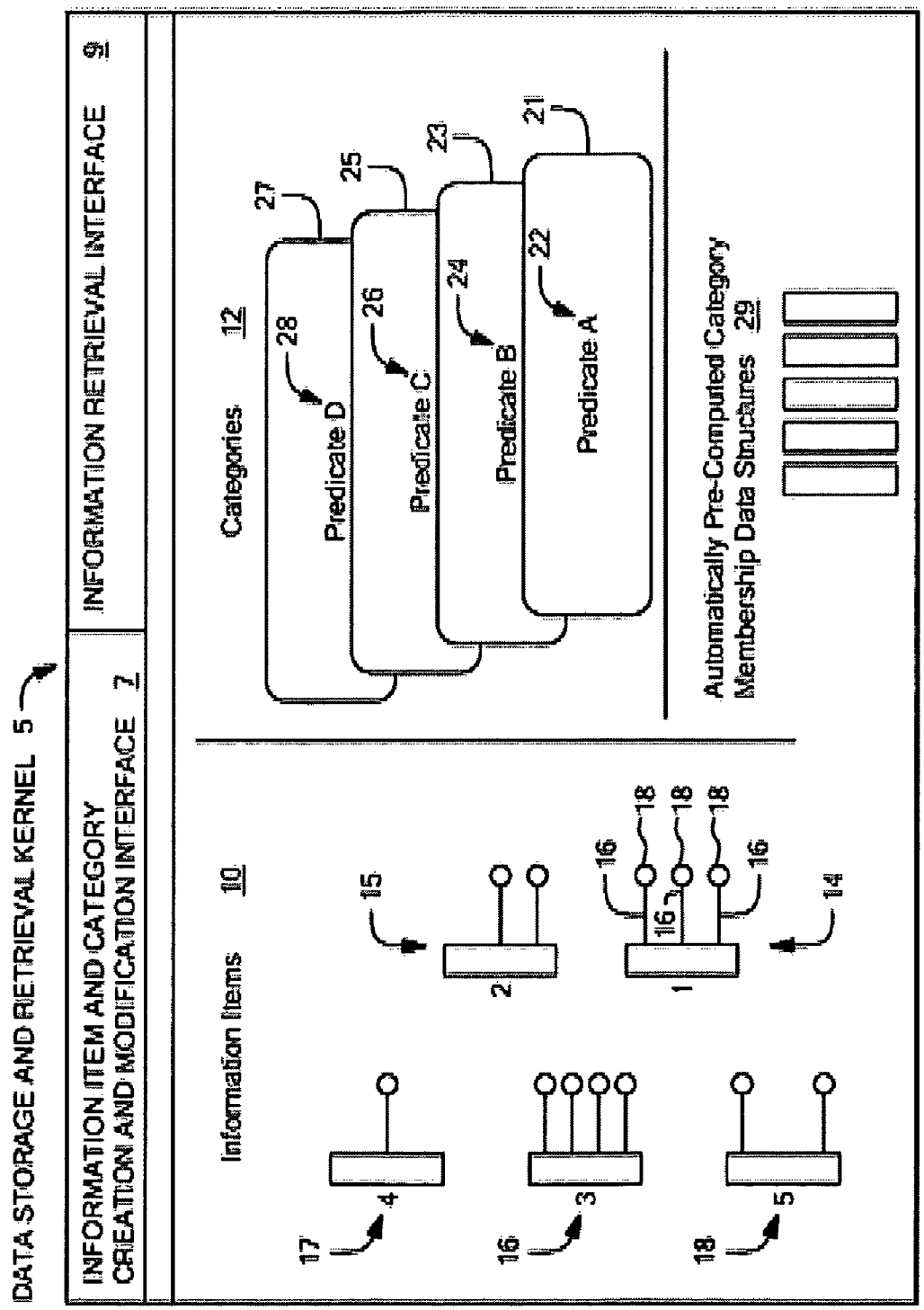
FIG. 1 is a block diagram illustrating components of an intensional categorization system for information management according to an embodiment of the system described herein.

Referring to FIG. 1, a data storage and retrieval kernel 5 includes an information item and category creation and modification interface 7, an information retrieval interface 9, a plurality of Information Items 10, and a number of Categories 12. The Information Items 10 and Categories 12 are logically independent and so may or may not be stored separately. The Categories 12 maintain no references (e.g. pointers) to or identifications (e.g. names) of the items included therewith. The structures of items within the Information Items 10 may be highly variable. Different ones of the Information Items 10 may include different numbers of properties having associated values. Thus, the Information Items 10 may each have different numbers of properties. Additionally, the number of properties for a given one of the Information Items 10 may change over time. For purposes of illustration, the Information Item 14 is shown including Properties 16, each having a corresponding one of a plurality of Values 18. The Values 18 may also change dynamically.

The Information Items 10 may include many specific types of information. In one embodiment, the Information Items 10 include IT resource information maintained by IT systems and personnel in support of IT Service Management applications and processes, and the properties of each of the Information Items 10 may accordingly include corresponding details of the various IT systems resources. Such IT resource information properties may, for example, include various types of configuration data, such as current operating system version, amount of physical memory, CPU speed, server host name, and any other type of information associated with that type of IT Resource. IT resource information properties may further include information regarding relationships to other IT resources. The preceding examples of IT resource information properties are given only for purposes of explanation, and the disclosed system is not so limited. Accordingly, the disclosed system may be implemented in embodiments using any other specific type of IT Resource information.

Each of the categories 12 includes or is associated with a predicate, which may be embodied as a software routine or software routine with a Boolean result. The predicate for a category provides a test for an information item to which the predicate is applied. If an information item passes the test defined by the predicate of a category, then the information item is considered to be contained within the category, and an association may be formed between the information item and the category. The disclosed system uses "intensional" category assignment, in that each category includes a predicate which, applied to an information item, logically returns true or false with respect to whether the information item belongs in that category. This approach is distinct from previous "extensional" approaches, which rely on information item identities and categories that include the information item lists. In traditional relational databases, only extensional categorization has been supported, represented by the table membership of the records in the database or by an explicit category property possessed by records in the database. Such existing systems have not supported testing of the contents of a record to determine a table to which the record belongs.

General definitions for "intensional definition" may be found in various sources. In the area of logic, an intensional definition gives the meaning of a term by giving all the properties required for something to fall under that definition—the necessary and sufficient conditions for belonging to a set being defined. One example of an intensional definition of "bachelor" is "unmarried man." This is because being an unmarried man is an essential property of something referred to as a bachelor. Being an unmarried man is a necessary condition of being a bachelor—one cannot be a bachelor without being an unmarried man. Being an unmarried man is also a sufficient condition of being a bachelor—any unmarried man is a bachelor. The intensional definition approach is opposite to the extensional definition approach, which defines by listing everything falling under a definition. Accordingly, an extensional definition of "bachelor" would be a listing of all the unmarried men in the world. In this regard, intensional definitions are best used when something has a clearly-defined set of properties, and work well for sets that are too large to list in an extensional definition. Moreover, it is impossible to give an extensional definition for an infinite set, but an intensional one can often be stated concisely. For example, while the infinite number of even numbers makes them impossible to list, they can be defined intensionally by saying that even numbers are integer multiples of two.

The predicates used in the assignment process provided by the disclosed system advantageously provide intensional definitions for corresponding ones of the categories 12. Accordingly, each predicate of the disclosed system tests the properties of an information item to determine if that information item belongs to the category defined by the predicate. The intensional definition of categories in the disclosed system enables categorization of information items at run time, and accordingly allows information items to dynamically change their categorical membership. The disclosed system enables checking information items at any time to determine whether the items have changed category membership. Each category must accordingly at least include a category name and a predicate which can be applied to an information item to determine if the information item belongs to the category.

In the embodiment of FIG. 1, each of the categories 12 has a corresponding predicate. Thus, a category 21 corresponds to Predicate A 22, a category 23 corresponds to Predicate B 24, a category 25 corresponds to Predicate C 26, and a category 27 corresponds to Predicate D 28. While for purposes of concise illustration, only four example categories are shown in the categories 12 of FIG. 1, the disclosed system is not so limited, and may be embodied using any specific number of categories.

The predicates for the categories 12 may each be satisfied by a different set of the information items 10. If one of the information items 10 satisfies any one of the predicates for the categories 12, it may be considered as belonging to the corresponding category for any processing or handling that might be associated with that corresponding category at any point during the processing of that information item. Additionally, if one of the information items 10 satisfies a predicate for one of the categories 12, then that information item can be included when all the members of the category are enumerated or otherwise processed at any point.

The information item and category creation and modification interface 7 permits information items 10 to be created and/or modified dynamically, and independently permits categories 12 to be created dynamically. The interface 7 may be embodied to allow information item creation and/or modification operations to be performed directly or indirectly (i.e., through an application) by a user, for example in an embodiment where the disclosed system stores IT resource information for an IT System, such as user configuration item attributes and history. Such user controlled actions may, for example, be provided by through graphical user interface (GUI) or the like associated with or provided by the interface 7. The interface 7 may also or alternatively allow information item creation and/or modification by software programs and/or processes external to the data storage and retrieval kernel 5. Such actions may, for example, be provided through an application programming interface (API) or the like associated with or provided by the interface 7.

In an embodiment, item modifications are provided in two different ways, depending on how categories are configured. Synchronous categories require that item modification operations are reflected immediately in the results of any subsequent information retrieval operations. In this way, a category can be configured such that when an item modification affecting the membership of that category returns a completion status, all subsequent queries will return results that completely reflect that modification. Asynchronous categories do not require immediate consistency with the modifications in subsequent information retrieval operations, although consistency is generally expected within a time period deemed adequate for information processing.

The information retrieval interface 9 permits retrieval of information items 10 dynamically and independently from the categorization of the information items 10 based on the categories 12. The interface 9 may allow information item retrieval to be performed directly or indirectly by a user, for example in an embodiment where the disclosed system stores personal information for that user. Such user controlled actions may, for example, be provided by through graphical user interface (GUI) or the like associated with or provided by the interface 9. Information item retrieval through the interface 9 is accomplished in a preferred embodiment based on input information retrieval queries including one or more category names associated with corresponding ones of the categories 12. The information items returned in response to such queries reflect the categorization of information items 10 based on the ones of categories 10 indicated by the category names contained in such queries. The interface 9 may be embodied such that any specific query language, including but not limited to SQL (Structured Query Language), XQuery, SPARQL, or the like, may be used to indicate the information items to be retrieved. The interface 9 may also or alternatively allow information item retrieval by software programs and/or processes external to the data storage and retrieval kernel 5. Such actions may, for example, be provided through an application programming interface (API) or the like associated with or provided by the interface 7.

Automatically pre-computed category membership data structures 29 may be used to support the information item retrieval interface 9 in order to provide better response times for queries, including those queries that may use category definitions as part of the query. The data structures 29 may be created or modified automatically, synchronously or asynchronously, in response to the items or categories being created or modified via the information and category creation and modification interface 7.

Any application may operate using or based on the dynamic categorizations provided by the disclosed system. For example, in one embodiment, a search application or tool may operate to perform searches and apply rankings of the search results based on categorizations of information items provided by the disclosed system. In such an embodiment, the search tool might respond to a search query by searching only for information items belonging to some combination of categories 12. As another example, the information items 10 may correspond to components of an IT system and the result of the dynamic categorization may be used as an input to one or more ITIL processes.

Any specific intensional definition may be used in the predicates for the categories of the disclosed system. For example, a predicate may test an information item for the existence in an information item of all properties and/or specific values of properties in a set of one or more properties. Or, a predicate may test an information item for the presence of at least one property/value within a set of properties. Another type of predicate may test the cardinality of certain properties/values. Such a predicate may test whether an information item has a specific property, and whether the information item has some predetermined number of values, or a number of values within a predetermined range, for that property. If the information item does not have the predetermined number of values for the property, then such a predicate is not satisfied.

The disclosed system may further include value-based predicates, which test for certain property values. Value-based predicates may test any specific property for any specific value. For example, value-based predicates may test whether a Boolean property has a true or a false value, whether a CPU Speed property has a certain clock-speed value, whether an IP address has a certain IP address value, whether an available memory cost property has a value between a minimum and a maximum number of bytes, whether a date property is between a starting date and an ending date, etc.

Another type of predicate that may be used in an embodiment of the disclosed system tests one or more referential properties of an information item. Such predicates test whether a value of a property is a reference (e.g. pointer) to another information item belonging to a specified category or set of categories.

The above described predicate examples are given for purposes of explanation only, and those skilled in the art will recognize that the disclosed system is not limited to those specific types of predicates, and that other types of predicates may readily be used in the alternative or additionally.

The intensional category definitions of the disclosed system may associate various combinations of information items into categories. For example, with reference to FIG. 1, the Category 21 has the Predicate A 22, which may be satisfied by the Information Item 1 14 and the Information Item 2 15. The Category 23 has the Predicate B 24, which may be satisfied by the Information Item 1 14, the Information Item 4 17, and the Information Item 5 18. The Category 25 is shown having the Predicate 26, which may be satisfied by none of the Information Items 10, and the Category 27 has the Predicate 28, which may be satisfied by all of the Information Items 10. Over time, the specific ones of the Information Items 10 that satisfy specific ones of the predicates for the Categories 12 may change as the properties of the Information Items 10 change. In addition, it is also possible for the intensional predicates to change.

The previous examples are given for purposes of explanation only, in order to illustrate the categorization process of the disclosed system. Accordingly, predicates within an embodiment of the disclosed system may operate to categorize information items across specific categories in various specific combinations.

Figure 2:
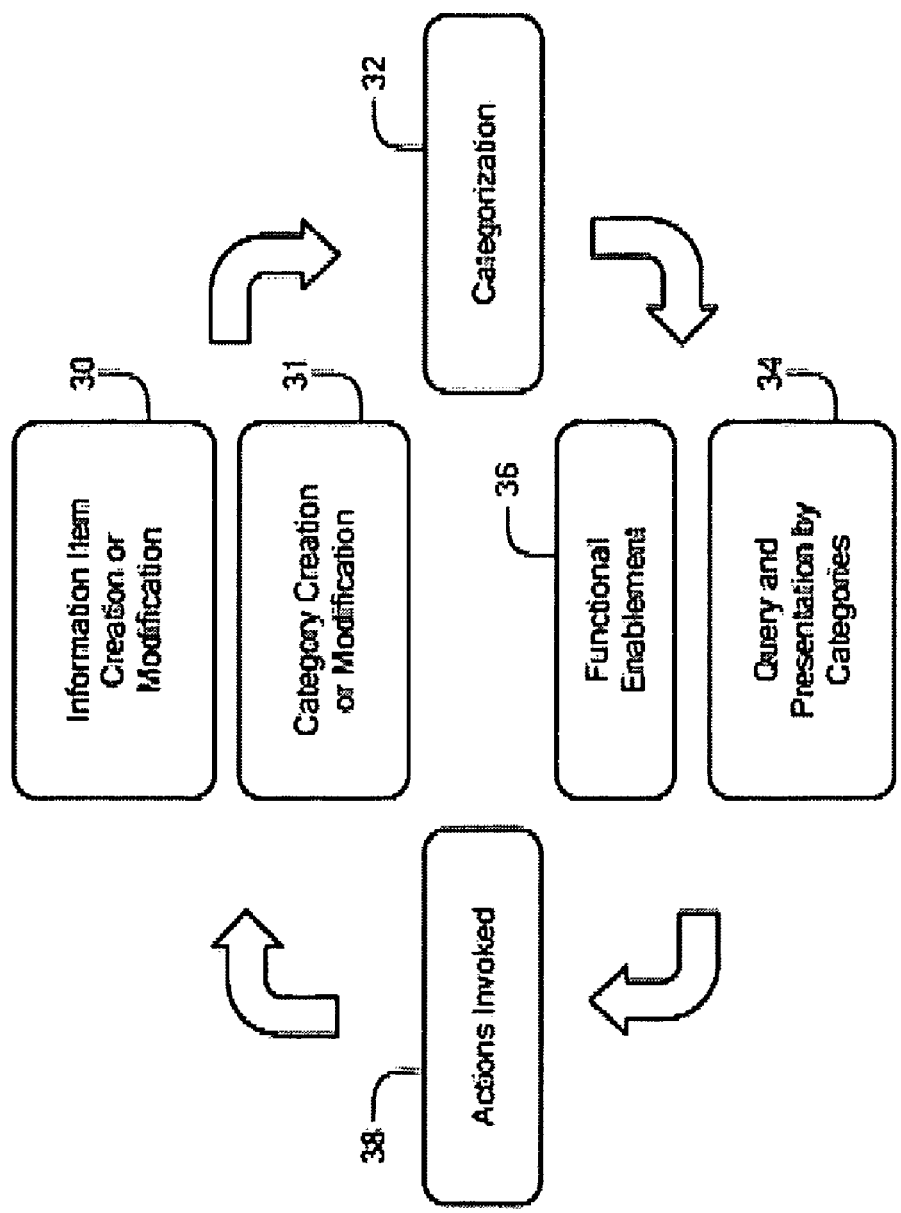
FIG. 2 is a flow chart illustrating operation of an intensional categorization system for information management according to an embodiment of the system described herein

As shown in FIG. 2, information items may pass through a series of one or more steps or actions 30, 31, 32, 34, 36, 38. At the step 30, the information items may be either created or subsequently modified. Information items may, for example, be created by being manually inserted by a user through a user interface, or by being automatically inserted as a result of information received over network (from a Resource Manager, for example, as the result of a Resource Discovery process). At the step 31, categories are either created, or subsequently modified. Categories may, for example, be created or modified as a result of installation of an application program (a new ITSM process, for example), activities performed during execution of an application program, user activities, and/or other events. By providing for on-going introduction of new and modification of existing categories, the disclosed system allows for dynamic participation of newly created, modified, or previously existing information items in one or more new or modified categories. The step 32, which provides categorization, then applies the predicate or predicates associated with one or more categories to the information items, in order to assign each information item to one or more categories. The step 32 may, for example, be performed at the same time as creation/modification, or at any subsequent point in time. The categorization of an information item may reflect the run time addition of or modification to one or more properties and/or the values of the information item (in the step 30 for example), and/or the run time addition of or modification to one or more categories (in the step 31 for example), independent of the step 32 that provides categorization. Advantageously, the step 32 may be performed automatically, independent and asynchronous with respect to the creation and/or modification of the information items, and/or with respect to the creation and/or modification of categories, allowing significant performance optimizations.

The assignment of items to one or more categories may be provided in various ways. For example, a number of automatically pre-computed category membership data structures may be created or modified at the step 32. The data structures may be used subsequently for efficiently identifying items to be retrieved that satisfy queries expressed at least in part using the category definitions.

At the step 34, automatically computed data structures from the step 32 may be used to support user operations or information rendering, such as category specific processing of user queries or requests, and/or category specific presentation of information items to the user based on category. For example, a user may request a retrieval and display of all information items relating to one or more categories that was applied at the step 32. Additionally, the categorization at the step 32 may enable a user to conveniently request and obtain a display of all information items related to a category for a specific work project, IT system incident, one or more application programs, or any other relevant category. Note that the tem "user" herein may be understood broadly to include processes that access the system and/or data thereof to provide the functionality described herein. Thus, for example, an automated application/process may obtain all information items relating to particular categories.

The categories associated with the information items at the step 32 may also or alternatively be used to facilitate application of certain functionality to the information items at the step 36, independent from and transparent to the user. In one example, where a category is used to identify those information items associated with a configuration compliance application, the presence of an indication of a particular configuration property (an inappropriate password on a server, for example) within the information item may satisfy the associated predicate. Satisfaction of such a predicate may be based on a pattern matching function that tests the information item for the existence of any specific property denoting the inappropriate password. If such a property exists on the information item, the category forms an association between the information item and the configuration compliance application, or provides an indication that the information item is associated with the application. Accordingly, based on the categorization provided at the step 32, functionality provided at the step 36 may responsively display an "out of compliance" message to the user within a graphical user interface while the user is viewing that information item. Or, in the case where the "out of compliance message" object had previously been grayed out, the disclosed system may operate to un-gray the message in response to the categorization at the step 32 when the user is viewing such an information item. Thus, an information item initially in compliance with the password constraints, which has subsequently had attached to it an inappropriate password property or the like, may be automatically categorized as an out of compliant configuration item, and based on that categorization can be subsequently treated by other applications as an out of compliance configuration. Those skilled in the art will recognize that various other specific functions may be provided at the step 36 in response to the specific categorization performed at step 32 for an information item.

Properties or values of the information items, such as the above described destination email address property, may be added to, modified, or removed from information items during information modification at the step 30, and/or in response to various user actions performed at the step 38. Thus, the disclosed system provides an application independent information item categorization step at the step 32. The item categorization at the step 32 operates using intensional category predicates independent from any subsequent use of the categories associated with the information items, and also independent from the step of modifying the information items. As an information item is recognized as a member of a new category, the overall system gains any resulting advantages that come with being able to treat the item as a member of the new category. Such benefits of newly determined category membership may make the information item more useful, or more easily accessible for certain purposes. Certain categories might be more significant for certain applications, and may result in a reduction in the amount of work in terms of how the information item is retrieved.

The system described herein may be used for a configuration management database (CMDB) of an IT system. The information items 10 may be configuration items (CIs) that represent components of the IT system. The term "components" as used herein should be understood to include any aspect of an IT system, including users, groups, service requests, etc. In an embodiment herein, the information items 10 are configuration items that may point to each other so that one or more values of a configuration item is expressed as a pointer to other configuration items. Thus, for example, if a number of configuration items have a value that is represented by a pointer to a specific configuration item, then the value for the number of configuration items may be changed by changing the specific configuration item to which the number of configuration items point.

There are many different types of CMDBs. Some CMDBs may be used to manage deployment and/or modification of system configuration only while some may also (or alternatively) be used in connection with monitoring/managing run time conditions. Thus, some information items 10 may relate to configuration of the system (e.g., disk A is connected to router B, user X has privileges Y, etc.) while other information items 10 may be run time performance items (e.g., it took X seconds to fulfill a particular data request, the printer is printing a Y pages per minute, etc.) or configuration item history of events.

In an embodiment herein the CMDB may be used as part of an IT Service management solution. In such a case, the CMDB may be used as input to mechanisms that handle change management, incident management, configuration management, problem management, release management, service level management, financial management, capacity management, IT service continuity management, and availability management. Change management relates to ensuring that standardized methods and procedures are used for efficient and prompt handling of all changes to, minimize the impact of any related incidents upon service. Incident management relates to restoring normal service operation as quickly as possible and minimizing the adverse impact on users and the organization. Configuration management relates to providing a logical model of the IT infrastructure (hardware, software and associated documentation) by identifying, maintaining and verifying the version of all configuration items. Problem management relates to minimizing the adverse impacts of incidents and to prevent recurrence of incidents. Release management relates to coordinating service providers and vendors involved with a significant release of hardware, software and associated documentation across a distributed environment. Service level management relates to maintaining and improving IT Service quality through a constant cycle of agreeing, monitoring and reporting to meet the customers' objectives. Financial management relates to providing cost-effective stewardship of the IT assets and resources used in providing IT services. Capacity management relates to ensuring that all the current and future capacity and performance aspects of the business requirements are provided cost effectively. IT service continuity management relates to ensuring that the required IT technical and service facilities can be recovered within required and agreed timeframes. Availability management relates to optimizing the capability of the IT infrastructure, services, and supporting organization to deliver a cost effective and sustained level of availability enabling IT to meet their objectives There are a number of conventions for classifying the constraints of a CMDB, some of which depend upon what is monitored by the CMDB. Some systems classify CMDB rules as being related to one of technical, ownership, or configuration while other classify rules as either relating to security or performance. However, for the system described herein, it is not necessary to classify each of the predicates as being a certain type since the system works by categorizing information according to whatever predicates are provided.

The CMDB may be configured by an administrator who creates/modifies predicates according to desired criteria, such as performance or security constraints. For example, suppose in a system for a particular organization, financial data should only be accessible by a certain group ("financial group") or IT administrators. A predicate may be created for a category of unauthorized financial data users with a rule that provides that a user belongs in the category if the user has access to financial data and the user is not an IT administrator and the user is not a member of the financial group. As discussed in more detail elsewhere herein, the system may perform certain actions based on population of certain categories. In an embodiment herein, users (IT administrators) may not access predicates directly, but may only run applications that access the output (items in categories). The applications may be configurable by the users to obtain certain data using certain formats. In some instances, applications may modify/extend predicates. In other embodiments, users may modify predicates directly. Note, however, that the addition of too many predicates may adversely impact the performance of the system.

As discussed above, the system provides for automatically pre-computed category membership data structures 29 that may be used to support the information item retrieval interface 9 in order to provide better response times for queries, including those queries that may use category definitions as part of the query. In the case of a CMDB, the data structures 29 may support IT configuration inquiries, problem investigation, determining the feasibility of IT additions/changes, determining what property values were changed within the last 24 hours, and any other possible CMDB query. Of course, in many cases, the value of the data structures 29 depends, at least in part, on the timeliness of the data structures 29. For example, if the CMDB is being used for real-time performance evaluation, then the data structures 29 may not be timely enough if a portion of the IT system becomes non-operational but the data structures 29 indicate there are no problems.

Figure 3:
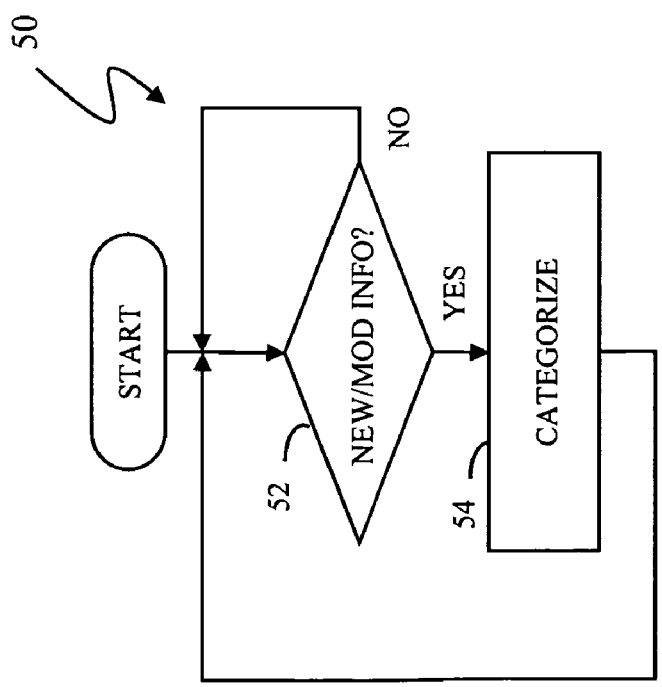
FIG. 3 is a flow chart showing updating category membership data structures according to an embodiment of the system described herein.

Referring to FIG. 3, a flow chart 50 illustrates steps performed in connection with categorizing information items 10. In the embodiment illustrated by the flow chart 50, the pre-computed category membership data structures 29 are updated (partially recomputed) each time a new information item 10 is added or an existing information item 10 is deleted or modified. Thus, the embodiment illustrated by the flow chart 50, which represent synchronous characterization of the data, may be useful in instances where the frequency of new/modified information items 10 is relatively low (e.g., a CMDB that is used just for IT configuration).

Processing begins at a first test step 52 where it is determined if any new and/or modified information items exist. If not, then the test step 52 loops back on itself to continue polling. Otherwise, control transfers from the test step 52 to a step 54 where the new/modified information is categorized according to the predicates, as described elsewhere herein. Note that it is not necessary to categorize any of the previously-received/modified info items 10 since these should have been already categorized when initially added/modified. Following the step 54, control transfers back to the test step 52 for a next iteration. Note that the processing illustrated by the step 52 and related step(s) may be implemented using any appropriate technology that provides the same result (e.g., new item queue, an interrupt, a software exception, etc.).

In some instances, new information items may be arriving and/or information items may be being modified at a rate that makes updating (recomputing) the data structures 29 each time prohibitive. In such cases, it may be possible to categorize the new/modified info items periodically. The time period may be set so as to maintain the data structures 29 reasonably up-to-date. In addition, as discussed in more detail below, it may be possible to perform a recomputation in between time periods in response to a user, programmatic, or other request to do so. Of course, the acceptability of a time period may depend, at least in part, on the tolerance of application(s) that use the data structures 29 for inconsistency between data in the data structures 29 and the actual state of the system.

Figure 4:
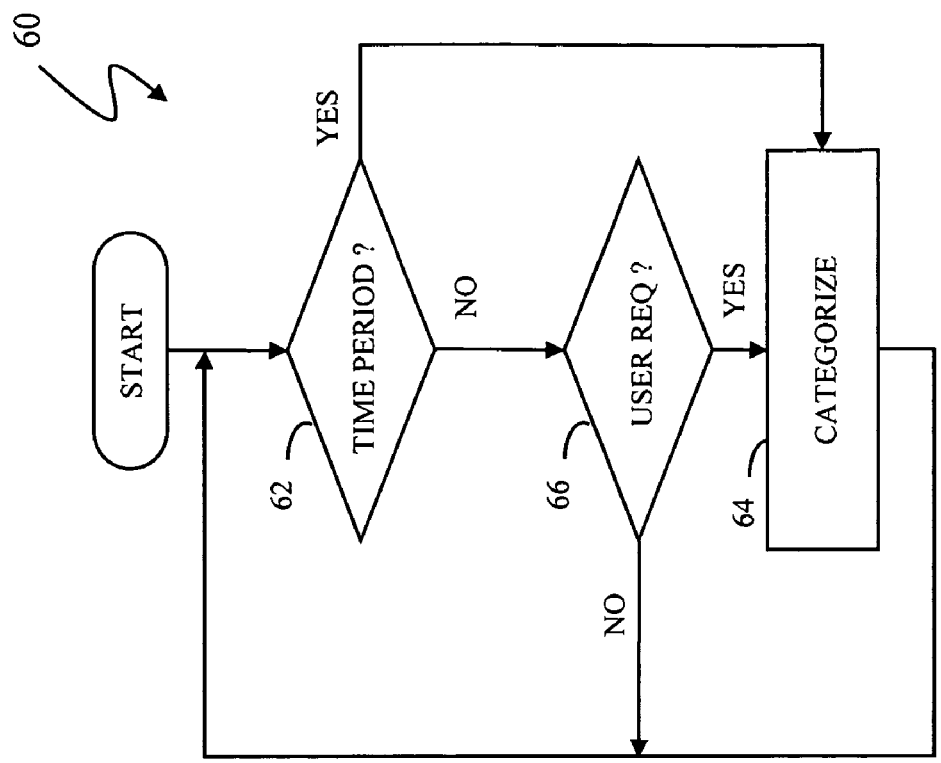
FIG. 4 is a flow chart showing updating category membership data structures according to an embodiment of the system described herein.

Referring to FIG. 4, a flow chart 60 illustrates steps performed in connection with periodically recomputing the data structures 29 for a CMDB. The embodiment illustrated by the flow chart 60 represents asynchronous characterization of the data, which may be useful in instances where the frequency of new/modified information items 10 is relatively high (e.g., a CMDB that is used for IT configuration and to monitor run time conditions).

Processing begins at a first step 62 where it is determined if the predetermined time period has passed. In an embodiment herein, the time period may be five minutes, although shorter or longer time periods may be used. If it is determined at the test step 62 that the time period has passed, then control transfers from the test step 62 to a step 64 where the new/modified information that has not yet been processed (i.e., since the previous iteration) is categorized according to the predicates, as described elsewhere herein. Following the step 64, control transfers back to the test step 62 for a next iteration.

If it is determined at the test step 62 that the time period has not passed, then control transfers from the test step 62 to a test step 66 where it is determined if a user (e.g., an IT administrator, an automated process, etc.) has requested that the category membership data structures 29 be brought up-to-date. A user may do this for any number of reasons. For example, a user may note that the IT system appears to be operating improperly but the data structures 29 do not yet indicate any anomalies. If it is determined at the test step 66 that the user has not made a request to bring the data structures 29 up-to-date, then control transfers from the test step 66 back to the test step 62 for another iteration. Otherwise, control transfers from the test step 66 to the step 64, discussed above, where the data structures 29 are brought up-to-date.

Note that, in some embodiments, it is possible to eliminate the data structures 29 altogether and simply recompute the requested categories on demand (i.e., when requested by a user). It is also possible to maintain the data structures 29, but only update the data structures 29 when category data is requested by a user.

It is useful to provide appropriate information from the categories 12 to a user (e.g., IT administrator, process). One or more applications may query the categories 12 (e.g., through the information retrieval interface 9, described above) and present the user with information based on at least a subset of the categories 12. For example, a subset of the categories 12 may relate to disk health. An application may access the subset of the categories 12 and display an indicator of disk health for one or more disks in a system. As another example, one discovery agent may find IP addresses of components on a network while another, unrelated, discovery agent may find hosts on a network. The two discovery agents may operate independently to eventually generate the information that component X at IP address Y is a host without being constrained, as in a conventional rule-based CMDB system, to coordinate the two agents and the results therefrom to provide the same information.

As another example, a simple application may display items in some of the categories, which may be divided into groups corresponding to normal operation (no trouble), warning (possible trouble) and alert (trouble). Of course, any other type of appropriate groupings may be used.

Figure 5B:
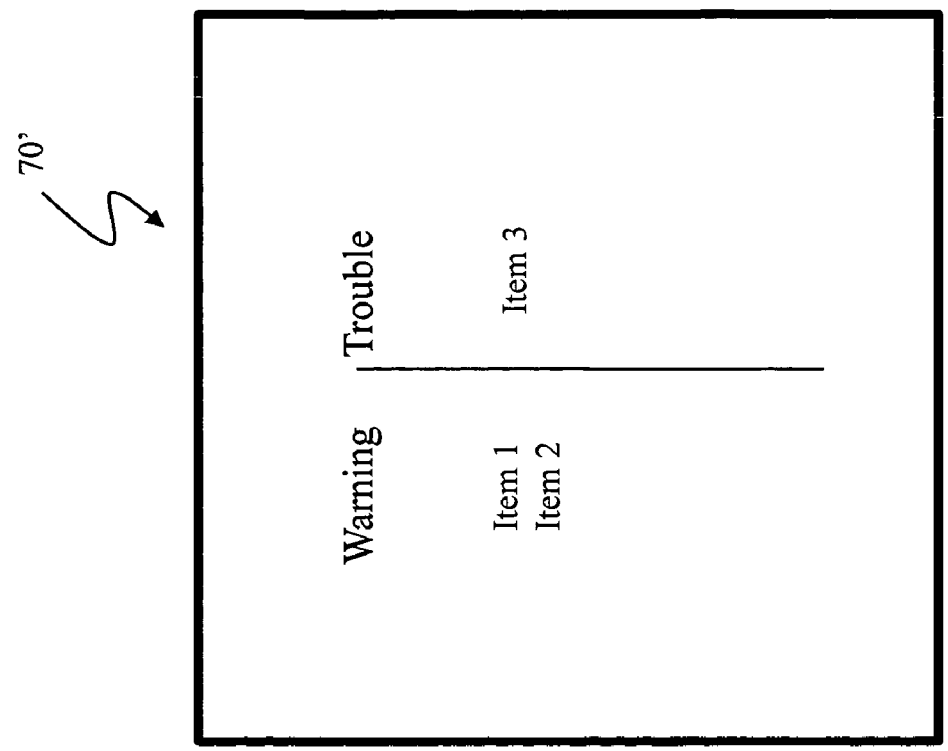
FIGS. 5A and 5B illustrate screen that display configuration items according to an embodiment of the system described herein.
Figure 5A:
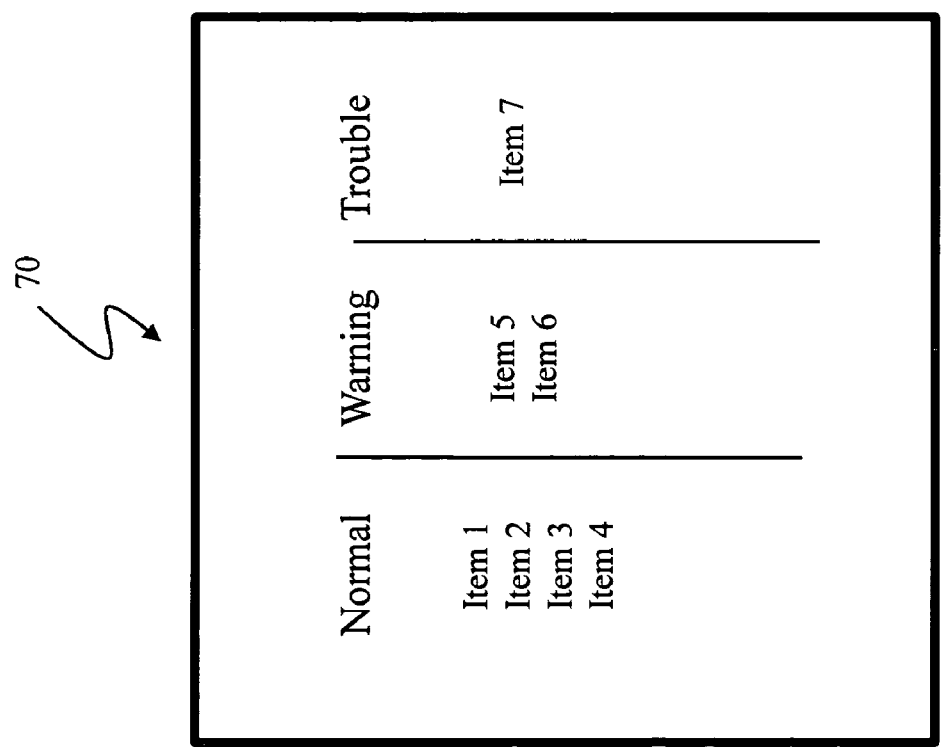

Referring to FIG. 5A, a screen 70 shows a user all of the items in categories of interest to the user, which are assigned one of three groups, as discussed above. The screen 70 may be generated by an application that may be installed after creation of at least some the items used to populate the screen. Part of the application installation may include creation of new categories of interest that are added to existing ones of the categories 12. The screen 70 may be populated with items returned from queries of the categories 12. A user looking at the screen ascertains the state of the IT system according the items listed under Normal, Warning, and Alert. An item listed under Normal could be something like "Printer Status OK". An item listed under Warning could be "Disk Almost full". An item under alert could be "Unauthorized user accessing financial data". Thus, the labels at the top of the screen 70 may correspond to categories.

Referring to FIG. 5B, a screen 70' is like the screen 70 of FIG. 5A except that items associated with the Normal group are not displayed. A user may be able to choose between the screens 70, 70' or the system may automatically transition between the screens 70, 70' according to an appropriate metric, such as total number of information items. In addition, the screens 70, 70' may be updated by processing associated with each of the predicates and/or by a separate process, discussed below, that periodically examines the categories 12 (e.g., through the information retrieval interface 12). Note that any other appropriate mechanism may be used to provide information to users, including, for example, other types of screens/interfaces, storing data in a file, sending data by email, etc. Note also that, as discussed elsewhere herein, the term "user" should be understood broadly as including automated processes that access the data and perform other appropriate processing as described herein.

The disclosed system provides significant advantages over traditional systems, in which categories are established at information item creation time, and maintained throughout the information item's lifetime. The system allows improved flexibility in the structure in which items are represented during the lifetimes of the items, as the items acquire new properties or change existing ones without needing to be recreated. The configuration management database system disclosed herein may use any of the techniques generally disclosed herein for managing and categorizing items, including computing the data structure 29 in response to a query.

The figures used herein are block diagram and flowchart illustrations of methods, apparatus(s) and computer program products according to an embodiment of the system described herein. It will be understood that each block of the figures, and combinations of the blocks, may be implemented by computer program instructions. The computer program instructions may be loaded onto a computer or other programmable data processing apparatus to produce a machine, such that the instructions which execute on the computer or other programmable data processing apparatus create means for implementing the functions specified in the block or blocks. The computer program instructions may also be stored in a computer-readable medium (memory) that may direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem. The system described herein may be implemented using the hardware described herein, variations thereof, or any other appropriate hardware capable of providing the functionality described herein. The system also includes computer software, in a computer-readable medium, that executes any of the steps described herein.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures. Accordingly, the invention should not be viewed as limited except by the scope and spirit of the appended claims.

What is claimed is:

1. A configuration management database system stored on a non-transitory computer readable memory in a computer system having at least one processor, comprising:

a plurality of configuration items, each of said configuration items including at least one property relating to a component of an information technology (IT) system, wherein the at least one property relating to the component of the IT system is a property that corresponds to run time performance of the component within the IT system;

a plurality of intensional category definitions that provide dynamic categorization of said plurality of configuration items, wherein each of said intensional category definitions includes a predicate that is operable to identify an input one of said configuration items as a member of a first category based on said at least one property of said input one of said configuration items, wherein, for a change in the at least one property in the input one of the configuration items, at least one of the predicates of the plurality of intensional category definitions identifies whether the change indicates a recategorization of the input one of the configuration items into at least a second category that is different from the first category; and at least one pre-computed category membership data structure to support efficient processing of at least one query, wherein the pre-computed category membership data structure is dynamically recomputed, wherein for the change in the at least one property in the input one of the configuration items indicating the recategorization of the input one of the configuration items to the second category according to the at least one of the predicates, the recategorization of the input one of the configuration items is updated in the pre-computed category membership data structure by the dynamic recomputing, and wherein the dynamic recomputing of the pre-computed category membership data structure is performed automatically in response to the change in the at least one property of the input one of the configuration items.

2. The system of claim 1, wherein the configuration management system provides inputs to mechanisms that handle at least one of: change management, incident management, configuration management, problem management, release management, service level management, financial management, capacity management, IT service continuity management, and availability management.

3. The system of claim 1, wherein each of said configuration item categories is operable to apply its associated predicate to at least one of said configuration items responsive to said configuration item being created.

4. The system of claim 1, wherein each of said configuration item categories is operable to apply its associated predicate to at least one of said configuration items responsive to said configuration item being modified.

5. The system of claim 4, wherein said modification to said at least one existing configuration item includes addition of a new property to said configuration item.

6. The system of claim 4, wherein said modification to said at least one existing configuration item includes providing a new value of a property of said configuration item.

7. The system of claim 1, wherein said predicate for at least one of said configuration item categories is operable to test an input configuration item for a predetermined property, and in the event that said input configuration item includes said predetermined property, generate an indication that said input configuration item is associated with said one of said configuration item categories.

8. The system of claim 1, wherein at least one of said configuration item categories is configured as a synchronous category, such that all item modification operations to items associated with said synchronous category are reflected in the results of all information retrieval operations received subsequent to receipt of said item modification operations and referring to said synchronous category.

9. The system of claim 1, wherein at least one of said configuration item categories is configured as an asynchronous category, such that item modification operations to items associated with said asynchronous category need not be reflected in the results of information retrieval operations received subsequent to receipt of said item modification operations and referring to said asynchronous category.

10. A method for providing a configuration management database system, comprising:
storing a plurality of configuration items, each of said configuration items including at least one property relating to a component of an information technology (IT) system, wherein the at least one property relating to the component of the IT system is a property that corresponds to run time performance of the component within the IT system;
storing a plurality of intensional category definitions operable to provide dynamic categorization of said plurality of configuration items, wherein each of said intensional category definitions includes a predicate, wherein said predicate is operable to identify an input one of said configuration items as a member of a first category based on said at least one property in said input one of said configuration items, wherein, for a change in the at least one property in the input one of the configuration items, at least one of the predicates of the plurality of intensional category definitions identifies whether the change indicates a recategorization of the input one of the configuration items into at least a second category that is different from the first category; and
pre-computing at least one category membership data structure to support efficient processing of at least one query, wherein the at least one category membership data structure is dynamically recomputed, wherein for the change in the at least one property in the input one of the configuration items indicating the recategorization of the input one of the configuration items to the second category according to the at least one of the predicates, the recategorization of the input one of the configuration items is updated in the at least one category membership data structure by the dynamic recomputing, and wherein the dynamic recomputing of the pre-computed category membership data structure is performed automatically in response to the change in the at least one property of the input one of the configuration items.

11. The method of claim 10, further comprising:
providing inputs to mechanisms that handle at least one of: change management, incident management, configuration management, problem management, release management, service level management, financial management, capacity management, IT service continuity management, and availability management.

12. The method of claim 10, wherein pre-computing is performed in response to at least one configuration item being added.

13. The method of claim 10, wherein pre-computing is performed in response to at least one configuration item being changed.

14. The method of claim 10, further comprising:
applying at least one predicate associated with said intensional category definitions in response to said at least one input query.

15. The method of claim 10, wherein each of said configuration item categories applies its associated predicate to at least one of said configuration items responsive to said configuration item being revised.

16. The method of claim 10, further comprising:
configuring at least one of said configuration item categories as a synchronous category; and
processing item modification operations to items associated with said synchronous category are reflected in the results of all information retrieval operations received subsequent to receipt said item modification operations and referring to said synchronous category.

17. The method of claim 10, further comprising:
configuring at least one of said configuration item categories as an asynchronous category; and
processing item modification operations to items associated with said asynchronous category are not be reflected in the results of at least one information retrieval operation received subsequent to receipt of said item modification operations and referring to said asynchronous category.

18. The method of claim 17, wherein pre-computing is performed in response to a user request.

19. A non-transitory computer-readable medium storing a computer program for a configuration management database system, the computer program comprising:
executable code that stores a plurality of configuration items, each of said configuration items including at least one property relating to a component of an information technology (IT) system, wherein the at least one property relating to the component of the IT system is a property that corresponds to run time performance of the component within the IT system;

executable code that stores a plurality of intensional category definitions operable to provide dynamic categorization of said plurality of configuration items, wherein each of said intensional category definitions includes a predicate, wherein said predicate is operable to identify an input one of said configuration items as a member of a first category based on said at least one property in said input one of said configuration items, wherein, for a change in the at least one property in the input one of the configuration items, at least one of the predicates of the plurality of intensional category definitions identifies whether the change indicates a recategorization of the input one of the configuration items into at least a second category that is different from the first category; and executable code that pre-computes at least one category membership data structure to support efficient processing of at least one query, wherein the at least one category membership data structure is dynamically recomputed, wherein for the change in the at least one property in the input one of the configuration items indicating the recategorization of the input one of the configuration items to the second category according to the at least one of the predicates, the recategorization of the input one of the configuration items is updated in the at least one category membership data structure by the dynamic recomputing, and wherein the dynamic recomputing of the category membership data structure is performed automatically in response to the change in the at least one property of the input one of the configuration items.

20. The non-transitory computer readable medium of claim 19, wherein data from the computer program is input to mechanisms that handle at least one of: change management, incident management, configuration management, problem management, release management, service level management, financial management, capacity management, IT service continuity management, and availability management.

* * * * *